UNITED STATES PATENT OFFICE.

EMERY M. DAVENPORT, OF POLAND, NEW YORK.

BALING SHORT-CUT HAY OR STRAW.

SPECIFICATION forming part of Letters Patent No. 340,769, dated April 27, 1886.

Application filed February 26, 1886. Serial No. 193,355. (No model.)

*To all whom it may concern:*

Be it known that I, EMERY M. DAVENPORT, of Poland, in the county of Chautauqua and State of New York, have invented a new and useful Improvement in Baling Short-Cut Hay or Straw; and I do hereby declare that the following is a full and exact description of the same, reference being had to the accompanying drawing, and to the letters of reference marked thereon.

The object of this improvement is the baling of short-cut feed—such as hay or straw—in a manner that is adapted to prevent the disintegration of the bale and wasting of the feed during the transportation of the same from one place to another. These results are attained in the bale illustrated in the drawing herewith filed as part hereof, which is a perspective representation of a bale of cut feed made according to the manner of my improvement.

In the drawing, A is the hay or straw.

B B' represent single binder-pieces, of thin plank, bound to the opposite ends of the bale by cords or wires C C C, hooked or tied together in the ordinary manner at any part of the bale that may be most convenient. These binder-pieces B B' are made to agree in size with the transverse area of the receiving-chamber of a suitable press, preferably Deaderick's perpetual press, and are therefore about the same width as the bale and as long as its sides. These binder-pieces are put into the press simultaneously with the hay or straw in positions to come at the ends of the bale, and the hay or straw is then compactly pressed together, as shown, and the binder-pieces B B' suitably secured to the body of the bale by cords or wires shown, and the formation of the bale completed before it is removed from the press and while the binder-pieces and hay or straw are under pressure in the same.

Forming the bale with wood binders at its ends and completing the same while under pressure therein would not be practicable, except with single binder-pieces, as series of pieces could not be made to preserve suitable relative positions to each other and to the hay or straw.

I am aware that short-cut feed has been baled by binding the sides of the same between series of longitudinal strips at each side of the bale, and also between series of transversely-arranged pieces of plank, and longitudinal strips to bind the ends of the transverse pieces to the body of the bale. I do not claim such features or arrangement; but

What I claim as new, and desire to secure by Letters Patent, is—

A bale provided at its ends with single binder-pieces about the same size as the ends of the bale, and suitably bound thereto by cords or wires, substantially as shown and specified.

In testimony whereof I affix my signature in presence of two witnesses.

EMERY M. DAVENPORT.

Witnesses:
H. V. PERRY,
J. ROBERT MOORE.